United States Patent [19]
Aubert et al.

[11] Patent Number: 5,405,224
[45] Date of Patent: Apr. 11, 1995

[54] SUBTERRANEAN DISPOSAL OF LIQUID AND SLURRIED SOLIDS WASTES

[75] Inventors: Winton G. Aubert, Plano; Edward Malachosky, Coppell; Thomas K. Perkins, Dallas, all of Tex.

[73] Assignee: Atlantic Richfield Company, Plano, Tex.

[21] Appl. No.: 8,375

[22] Filed: Jan. 25, 1993

[51] Int. Cl.6 .............................................. B09B 3/00
[52] U.S. Cl. ........................ 405/128; 166/308; 588/250
[58] Field of Search ............... 405/128, 129, 258, 267; 166/305 D, 308; 588/250

[56] References Cited

U.S. PATENT DOCUMENTS

| | | | |
|---|---|---|---|
| 2,707,171 | 4/1955 | Miller | 166/305 D |
| 3,526,279 | 9/1970 | Colburn | 405/128 X |
| 4,560,503 | 12/1985 | Bradley | 588/250 |
| 5,108,226 | 4/1992 | Jennings | 405/128 |
| 5,191,157 | 3/1993 | Crocker | 405/128 X |
| 5,226,749 | 7/1993 | Perkins | 405/128 |

Primary Examiner—David H. Corbin
Attorney, Agent, or Firm—Michael E. Martin

[57] ABSTRACT

Liquid wastes and slurries of ground solids wastes are injected into earth formation zones which have a fluid content of fluid similar to the liquid wastes or slurry which is below the irreducible saturation level for the liquid wastes or slurry to be injected. The formation may be non-hydrocarbon bearing or a depleted hydrocarbon bearing reservoir which has been depleted by enhanced fluid recovery techniques below its ambient irreducible fluid saturation value.

12 Claims, 1 Drawing Sheet

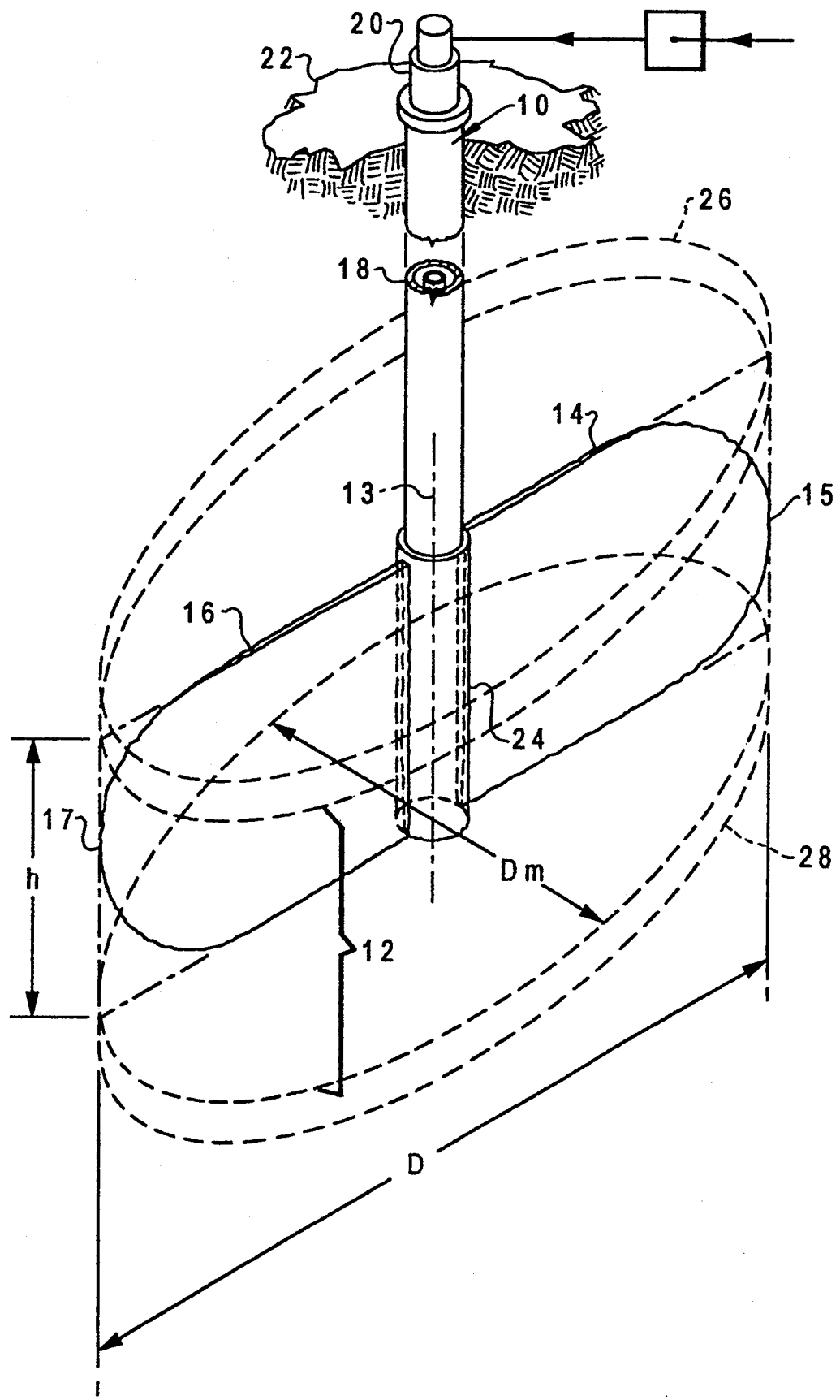

SUBTERRANEAN DISPOSAL OF LIQUID AND SLURRIED SOLIDS WASTES

BACKGROUND OF THE INVENTION

1. Field of the Invention

The present invention pertains to a method of disposing of oily liquid wastes, in particular, by injecting the waste materials into a fractured subterranean earth formation in an amount which does not exceed the irreducible liquid saturation level of the formation with respect to said oily liquid wastes.

2. Background

Satisfactory disposal of liquid and slurried solids waste materials into subterranean earth formations requires adherence to certain conditions which control the residency of the waste materials in a predetermined zone where the materials are injected. Waste materials may be disposed of in subterranean earth formations by injecting the material in the form of a liquid or a slurry of fine solids particles through an injection well into a predetermined disposal zone by hydraulically fracturing the earth in the disposal zone to accommodate a suitable volume of waste material. In certain areas where contamination by the waste material is not of any concern, that is, for example, the disposal zone is not near a source of usable water, the waste material is merely injected through a hydraulic fracture or, if the earth formation is of a highly permeable, unconsolidated character, the material simply diffuses and disperses into the formation.

However, in areas where it is possible that the waste material may migrate to a source of usable water or usable minerals which would eventually result in the waste material being brought back to the surface as a contaminant in the recovered water or mineral, the designated formation disposal zone must adhere to certain criteria. A U.S. patent application entitled "Waste Disposal in Hydraulically Fractured Earth Formations", Ser. No. 07/910,381, filed Jul. 8, 1992 in the name of Thomas K. Perkins and assigned to the assignee of the present invention discusses certain desirable characteristics of earth formations which can be hydraulically fractured to dispose of solids particulate wastes, in particular, which are slurried and injected in the form of a viscous fluid into the formation. This application discusses the need to define a zone of interest for disposal which is bounded by earth formation zones which have higher in situ compressive stresses so that the hydraulic fracture will be confined to the designated formation zone of interest. Another desirable feature according to the Perkins patent application is the requirement of layers of permeable and relatively impermeable material in the zone of interest which is fractured so that relatively unrestricted flow channels are formed in the fracture to permit disposal of substantial volumes of waste material.

Unfortunately, earth formations having all of the features described in the Perkins patent application are not always available for disposal of wastes through injection wells. However, certain wastes such as oily liquid wastes and similar wastes having water and oil content, or primarily water-like liquid content, may be disposed of in earth formation zones which have other characteristics which will prevent the waste materials from leaving the predetermined formation zone of interest. In accordance with the present invention, a unique disposal method has been discovered which, although may benefit from the characteristics of the Perkins invention, also benefits from another unique formation property with respect to the characteristics of the waste material. The number and volume space of suitable sites available for disposal of the projected and ever-growing volume of liquid waste materials is substantially enhanced by the disposal method of the present invention.

SUMMARY OF THE INVENTION

The present invention pertains to an improved method of disposing of liquid waste materials, particularly oily liquids, into an earth formation by injecting the waste material into a formation zone wherein the irreducible liquid saturation value of the zone for the particular liquid or liquid mixture is not exceeded by the volume of waste material injected.

In accordance with an important aspect of the present invention, an earth formation zone is defined or delineated having a predetermined irreducible liquid saturation value for the liquid or liquid mixture to be injected and whereby liquid is then injected into the formation zone in a quantity which will not exceed the irreducible saturation value of the defined zone. The zone may be defined generally as a volume having a generally elliptical shape which is intersected at its center by an injection well and by a plane in which lies the well axis and a vertical two-winged fracture extending from the well. The formation zone may also be delimited by formation zones which have higher in situ stresses.

In accordance with yet a further aspect of the present invention, liquid oil wastes may be disposed of through an injection well and into an earth formation zone which is non-hydrocarbon bearing but which is porous and has a defined irreducible oil saturation value which will accommodate a predetermined quantity of oily wastes.

Still further in accordance with the present invention, there is provided a method of disposing of liquid wastes having hydrocarbon substances therein and wherein such wastes are injected into an earth formation zone characterized as a hydrocarbon-bearing reservoir which has been depleted to an extent wherein the oil remaining in the reservoir, if any, is below the natural irreducible oil saturation level of the reservoir. Such depletion of the reservoir may have been accomplished by one or more oil production stimulation or enhanced recovery methods including miscible and immiscible fluid injection into the reservoir. Moreover, as long as the volume of oily waste injected is negligible relative to the volume of oil already in the formation zone, the resultant changes in concentrations of the oil materials are insignificant. Injection of oily wastes containing naturally-occurring compounds into depleted oil-bearing formations is one way of returning such materials to their origin.

Those skilled in the art will further appreciate the above-noted features and advantages of the present invention together with other superior aspects thereof upon reading the detailed description which follows in conjunction with the drawing.

BRIEF DESCRIPTION OF THE DRAWING

The drawing FIGURE is a schematic diagram of an injection well penetrating an earth formation zone in which certain liquid wastes may be disposed of in accordance with the method of the present invention.

DESCRIPTION OF A PREFERRED EMBODIMENT

Depending on the relative magnitudes of adhesive and cohesive forces acting between certain liquids and certain earth materials, small pore spaces within some earth materials may trap droplets of non-aqueous liquids such as hydrocarbon oils. For example, sandstone, a common earth formation, is a porous and relatively permeable medium wherein pore spaces within the sandstone are, to varying degrees, connected by relatively smaller cross-section area passages, sometimes referred to as pore "throats". In sandstone formations most oils, and particularly hydrocarbons, tend to form roughly spherical droplets within the pore sized constraints, since the silica formation material is preferentially water wet. The relationships of adhesion and cohesion for oil and water in contact with silica causes water to spread over the silica surfaces and oil to form droplets. Some passages such as the pore throats in sandstone are smaller than the diameter of the oil droplets that form under most conditions of residency in the formation.

Accordingly, external energy is required to deform these oil droplets sufficiently so that they pass through the small channels or throats to then occupy the relatively larger pore spaces. Energy sufficient to overcome the surface tension of the oil droplets can be supplied by injection of fluids under pump-supplied pressures but this required energy is usually much greater than that arising from natural formation pressure gradients. In this regard, it has been determined that certain oily liquids can be pumped under pressure into sandstone formations and the oil droplets formed, once in the formation, are deformed under pressure to pass through the relatively small passageways or pore throats so that these droplets can then occupy the larger rock pore spaces. Once the droplets are in these larger pore spaces, natural formation conditions will cause them to remain there.

The measure of a formation which determines whether or not certain liquids will remain in residence within the pore spaces of the earth or rock is sometimes referred to as the irreducible saturation value for the particular fluid of interest. In general, the fluid saturation value, S, for a particular fluid, f, is defined as:

$$S_f = V_f / V_{pt}$$

wherein $v_f$ is the maximum volume of fluid in a defined volume of the formation rock under natural or ambient conditions in the formation and $V_{pt}$ is the total pore volume of the same defined volume of rock. The irreducible saturation value, $S_{if}$, of a fluid, f, is generally regarded to be less than the value of $S_f$. Moreover, the numerical value of $S_{if}$ may also be a function of stimulation techniques. For example, the irreducible fluid saturation value of a particular fluid in a particular formation rock for natural or ambient conditions in the earth formation will normally be higher than the irreducible saturation value if certain stimulation techniques are carried out such as miscible or immiscible fluid injection to drive the particular fluid, f, out of the pore spaces and into a fluid production well. Methods for determining fluid saturations of a particular rock formation, together with the irreducible fluid saturation values for different fluids and different rock formations will not be discussed in further detail herein. However, these methods are well documented and one source of discussion is *Petroleum Engineering Handbook*, 1987, Society of Petroleum Engineers, Richardson, Tex., the pertinent portions of which, including Chapters 26 through 28, are incorporated herein by reference with respect to methods for determining porosity, fluid saturation of samples of earth formations and the irreducible fluid saturations of such formations.

The present invention contemplates that a fluid injection well may extend into an earth formation zone having a predetermined irreducible fluid saturation value with respect to the type of fluid to be disposed of into the formation. The formation physical characteristics may also be such as to respond to injected fluid at high pressures to undergo hydraulic fracturing wherein a so-called two-winged vertical fracture will extend generally radially outwardly from the wellbore a predetermined distance. Surface or downhole seismic measurements may be used to determine the radial and vertical extent of the fractures, with respect to the wellbore axis, as they are formed. The formation disposal zone may, preferably, be bounded by formation zones having in situ compressive stresses which are higher than the stresses in the disposal zone so as to confine the vertical growth of the fractures, for example. The permeability of the disposal zone may also be variable and in accordance with the type of zone preferred for the disposal method of the above-referenced patent application to Perkins.

Referring to the drawing FIGURE, there is illustrated a schematic of an injection well 10 which has been drilled into an earth formation zone of interest 12 which is defined, generally, to have an elliptical shape when viewed in a plane normal to the well axis 13, as illustrated. The depth and diameters of the zone of interest 12 are also generally defined by vertically-extending, opposed fracture wings 14 and 16 which have been generated by injecting the waste material, or a hydraulic fracturing fluid, into the injection well 10 in a conventional manner. The fractures 14 and 16 typically have radial extremities or tip portions 15 and 17, respectively, which also have a somewhat elliptical shape when viewing the plane of the fractures. The exemplary well 10 has a casing 18 which extends downward from a conventional wellhead 20 at the earth's surface 22. An open hole portion 24 extends below the casing 18 of the exemplary well, although the casing 18 may extend into the zone of interest 12 and be suitably perforated for injecting the liquid wastes into the zone of interest. In the injection well arrangement illustrated, the formation zone 12 is bounded by zones 26 and 28 above and below the zone 12, respectively, which preferably have higher in situ compressive stresses than the zone 12 so that the fracture wings 14 and 16 do not grow substantially out of the zone 12 in either direction.

In the somewhat idealized formation zone 12, it is contemplated that the earth may be hydraulically fractured by a fracturing fluid or by merely injecting the slurried or liquid wastes initially and at a pressure sufficient to create the fractures 14 and 16. These fractures will typically form in a direction which is normal to the minimum in situ compressive stress in the zone 12. The radial extent of the fractures 14 and 16 may be determined by monitoring the growth of the fracture with seismic instruments, for example, and the vertical height of the fracture may also be determined by conventional logging devices or by a borehole televiewer device, both following commercially available practices and using commercially available devices. The fractures 14 and 16 may grow in directions other than vertical and are generally dependent on the direction of the minimum in situ compressive stresses in the zone 12.

If the waste to be disposed of is, for example, a hydrocarbon oil which has been contaminated or is otherwise unsuitable for use or other means of disposal, the type of formation to be sought for disposal of such oil is one which is preferably non-hydrocarbon bearing and which has a relatively high irreducible saturation value for hydrocarbon oils. As mentioned previously, sandstone formations are easily water wetted but are not normally oil wetted and are generally suitable for oil disposal if all criteria, in accordance with this invention, are met. Conventional core sample obtaining techniques may be used to tap the zone 12 to obtain one or more core samples by which the irreducible oil saturation value and the vertical boundaries of the zone may be determined. The vertical extent of the open hole or fractured portion 24 of the well 10 may then be determined or drilled based on the amount of waste to be disposed of into the formation zone of interest and the material is injected into the well 10 and into the open hole portion to create the fractures 14 and 16. Alternatively, the fractures may first be created by conventional fracturing fluids.

It may be assumed that the volume of formation material which will be invaded by the liquid waste will be a space comprising a somewhat elliptical shaped "cylinder" having a height, h, determined by the open hole portion 24 of the wellbore or a packed off zone in a well using conventional packers or plugs, not shown, to delimit the upper and lower boundaries of the well. Another limit on the height, h, of the zone 12 will be predetermined by formations having zones 26 and 28 which have higher in situ compressive stresses. This latter limit on height, h, may also be the expected height of the fractures 14 and 16. The volume of waste material, Vw, which may be injected into zone 12, will be based on the porosity $\phi$ of the zone 12, taken from conventional core measurements, the assumed volume of zone 12, and the irreducible fluid saturation value $S_{if}$. The equation below includes a value of zone 12 volume or space based on an ellipse having an area A and height h.

$$Vw = S_{if} \cdot \phi \cdot A \cdot h$$

where $$A = \pi/4 \cdot D \cdot Dm$$

The major diameter, D, of the elliptical zone 12 may be determined by monitoring the radial growth of the fractures 14 and 16 during injection of the waste material or during a pre-waste disposal hydraulic fracturing of the formation zone of interest. The minor diameter of the ellipse, Dm, may be assumed to be about seventy five percent of the major diameter, D, based on the shapes of formation zones invaded by injection fluids in fluid injection or stimulation methods used in oil production. Accordingly, once the irreducible saturation level, $S_{if}$, is determined from core samples, for example, and the vertical extent of the formation zone of interest 12 is predetermined from well conditions, the waste may be injected until the total volume of waste injected approaches the irreducible fluid saturation value of the volume of the formation zone 12 which has been predetermined from its porosity, height, h, and its diameters, D, and Dm. The irreducible fluid saturation value for the formation zone 12 will, of course, be a different value for different fluids, and as a result of stimulation or displacement treatments with respect to a particular fluid. For purposes of disposing of oily liquids into the formation zone 12, however, the value of the irreducible fluid saturation level which would result from natural or ambient forces and conditions is all that is considered necessary. A sample of the formation zone of interest may, of course, be tested to determine the value of $S_{if}$ and porosity, $\phi$.

The formation zone of interest 12 may also be a hydrocarbon-bearing formation which has been depleted below its natural or ambient irreducible fluid saturation level. For example, if the formation zone 12 has been subjected to enhanced recovery techniques such as steam flooding, or miscible gas or solvent injection to drive hydrocarbon fluids out of the zone, then the amount of hydrocarbon fluids per unit volume of the formation zone remaining is below the irreducible fluid saturation level for ambient formation conditions. Hydrocarbon liquids may be reinjected into the formation up to the ambient irreducible fluid saturation level without concern for migration of these fluids away from the zone 12.

Accordingly, for a particular type of liquid or finely ground, slurried solids waste material, a formation may be identified which has an irreducible fluid saturation value under ambient formation conditions, which is not already met by fluids in the formation, and the particular fluid to be disposed of may then be injected into that formation in a zone of interest defined by an injection well, the radial extent of fractures extending from the well and, possibly, by the height of the formation as delimited by the fractures or by formation zones which exhibit higher in situ compressive stresses than the injection zone. If the amount of waste to be disposed of is less than the volume of the formation zone of interest which may be occupied by a particular fluid without exceeding saturation, then, all of this liquid may be injected into the formation zone by hydraulically fracturing the zone to create a substantially vertical, opposed two-winged fracture, as illustrated in the drawing.

Those skilled in the art will recognize that the improved liquid and slurried solids waste disposal method of the present invention may be subjected to various substitutions and modifications without departing from the scope and spirit of the invention as set forth in the appended claims.

What is claimed is:

1. A method of disposing of liquid wastes into a subterranean earth formation zone of interest comprising the steps of:

determining the irreducible fluid saturation value for said zone of interest with respect to said liquid wastes to be disposed therein;

injecting said liquid wastes into said zone of interest until a predetermined volume of said zone of interest is occupied by said wastes;

terminating said injection before exceeding said determined irreducible fluid saturation value; and retaining said liquid wastes in said zone of interest so long as said zone of interest is at ambient conditions.

2. The method set forth in claim 1 including the step of:

providing said zone of interest bounded on at least one side by a formation zone having an in situ compressive stress which is greater than the in situ compressive stress of said zone of interest.

3. The method set forth in claim 1 including the step of:

injecting said liquid waste into said formation through an injection well penetrating said zone of interest.

4. The method set forth in claim 1 including the step of:

providing said zone of interest as substantially sandstone.

5. The method set forth in claim 1 including the step of:

defining said zone of interest as a space formed at least in part by a vertical two-winged fracture having a height, h, and a major diameter, D, delimiting the radial extent of said fracture.

6. The method set forth in claim 5 including the step of:

defining said space in part by an elliptical area having a major diameter D, and a minor diameter Dm and defining the volume of waste which may be injected into said zone of interest as the product of said elliptical area, height h, the porosity of the formation material in said space and the irreducible fluid saturation value of said zone of interest.

7. A method of disposing of oily liquid wastes into an earth formation comprising the steps of:

providing an injection well including a portion penetrating said formation;

determining the irreducible liquid saturation value for a zone of interest in said formation with respect to the oily liquid wastes to be disposed of therein;

injecting said oily liquid wastes into said zone of interest by hydraulically fracturing said zone of interest from a portion of a wellbore of said injection well to form a substantially vertically-extending, two-winged hydraulic fracture in said zone of interest; and continuing the injection of said oily liquid wastes until a volume of said zone of interest defined at least in part by a space having a height corresponding to the vertical height of said fracture and a substantially elliptical cross sectional area in a plane normal to the central axis of said well is filled with oily liquid wastes to an amount not to exceed said irreducible fluid saturation value.

8. The method set forth in claim 7 including the step of:

defining said elliptical area to have a major diameter delimited by the radial extent of said fracture with respect to said well.

9. The method set forth in claim 7 including the step of:

providing said zone of interest as a depleted hydrocarbon-bearing formation which has been depleted by enhanced oil recovery techniques to a hydrocarbon liquid saturation value below the ambient irreducible hydrocarbon liquid saturation value of said formation.

10. A method of disposing of one of slurried solids wastes and liquid wastes into an earth formation comprising the steps of:

providing an injection well including a portion penetrating said formation into a formation zone of interest;

determining the irreducible fluid saturation value for the formation zone of interest with respect to the wastes to be disposed of therein;

fracturing said zone of interest; and injecting said wastes into said zone of interest until a predetermined volume of said zone of interest is occupied by said wastes in an amount not to exceed said irreducible fluid saturation value.

11. The method set forth in claim 10 including the step of:

providing said zone of interest bounded on at least one side by a formation zone having an in situ compressive stress which is greater than the in situ compressive stress of said zone of interest.

12. The method set forth in claim 10 including the step of:

providing said zone of interest as substantially sandstone and said wastes as comprising hydrocarbon oils.

* * * * *